United States Patent
Grundy

[15] 3,651,765
[45] Mar. 28, 1972

[54] TRAIN LINE COMMUNICATION AND CONTROL STEM

[72] Inventor: Reed H. Grundy, Murrysville, Pa.

[73] Assignee: Westinghouse Air Brake Company, Swissvale, Pa.

[22] Filed: Apr. 14, 1970

[21] Appl. No.: 28,378

[52] U.S. Cl. ..............................105/61, 317/140, 340/167 A
[51] Int. Cl. .........................................................B60l 15/08
[58] Field of Search ...............325/38, 64; 343/225; 307/271; 340/206, 167, 172; 318/91, 101, 103; 317/140, 139, 137; 105/61

[56] References Cited

UNITED STATES PATENTS

| | | | |
|---|---|---|---|
| 2,930,888 | 3/1960 | Crawford et al. | 317/139 X |
| 2,462,134 | 2/1949 | Scully | 340/167 A X |
| 2,515,968 | 7/1950 | Shanklin | 340/167 A |
| 2,724,745 | 11/1955 | Brewer | 340/172 X |

Primary Examiner—Arthur L. La Point
Assistant Examiner—George H. Libman
Attorney—H. A. Williamson, A. G. Williamson, Jr. and J. B. Sotak

[57] ABSTRACT

An asymetrical, astable multivibrator, at the control location for a multiple unit train, transmits a control signal having a selected duty cycle characteristic over a single train line channel. The duty cycle percentage is selectively varied by a transistorized switching bank which connects different resistors into the RC timing circuit for one-half of the multivibrator element, the other half having a fixed timing circuit. These switching transistors are selectively controlled by the train operator in accordance with the desired train operating mode. The transmitted control signal is received on each car and converted into an average voltage whose level varies with percent duty cycle. On each car, this average voltage is compared, in a transistorized comparator element, with a reference voltage preset in accordance with the desired operating mode of that car within the overall train operation. When the average voltage is less than the reference voltage, a controller on that car is actuated to control the car function. With different reference voltages preset on the several cars, sequential activation of the car control functions may be obtained.

4 Claims, 3 Drawing Figures

INVENTOR
Reed H. Grundy

TRAIN LINE COMMUNICATION AND CONTROL STEM

My invention relates to a train line communication and/or control system. More particularly, this invention relates to a communication system for transmitting control functions or indications between an operator's location and the several cars of a multi-car, self-propelled train.

In the basic or prior art arrangement for communicating between cars of multi-car train, for example, in rapid transit systems, direct current energy is applied at one end of a physical train line wire to cause some action or reaction at the other end of the wire, or even at several locations one on each car of the train. These actions or reactions may be the resulting control or movement of a controllable function on the train. In the former system, therefore, the control was either on or off only. For example, one typical controllable function comprises the propulsion motor or motors, which were either turned on or turned off on all cars. Another typical controllable function is the brake pressure which could either be turned on or off at some selected level simultaneously on each car of the train. In other words, such control functions were transmitted from the operator's location simultaneously to similar apparatus on each of the several cars. Although such train lines are multi-wire cables, many of the wires must be assigned for transmitting indications or controls pertaining to the operation of the car doors, the positioning of the train signs, the turning on or off of car lights, and the transmission of indications or measurements of the braking air pressure available. The more modern and sophisticated propulsion and brake control concepts which have been developed to provide a smoother and more comfortable ride, as well as more efficient operation, require additional control functions. It is impracticable or at least quite expensive to provide additional train line wires. At the same time, it is not possible to eliminate any of the direct on or off control functions for other items of equipment as above enumerated, that is, doors and train signs. Therefore, a need exists for some arrangement which will provide additional communication channels over an existing train line cable so that a sufficient number of control functions or signals may be transmitted to properly control the newer and more sophisticated propulsion and braking systems.

Accordingly, one object of this invention is an improved train line communication system.

Another object is a novel arrangement providing additional control or communication channels over existing train line cable wires.

A further object of this invention is communication apparatus that transmits several distinct functions over a single train line wire.

Still another object is a control function transmission arrangement for individually controlling functions on several cars of a train over a single wire in the train line cable.

It is also an object of this invention to provide a communication system for transmitting a plurality of functions over a single channel in the form of signals having a distinct duty cycle characteristic for each function to be transmitted.

A further object of the invention is an arrangement for transmitting similar functions successively to several cars of a train over a single train line wire using signals with selected duty cycle characteristics having successive increments as functions are transmitted to additional cars.

Other objects, features, and advantages of this invention will become apparent from the following specification when taken in connection with the appended claims and accompanying drawings.

In practicing my invention, I provide a transistorized, asymmetrical, astable multivibrator at the function transmission location which is associated with the operator's control panel for the train. The timing of the first condition of this multivibrator, i.e., when a first transistor conducts, is controlled by a fixed series resistance-capacitance timing circuit. However, the timing for the second condition of the multivibrator, i.e., other transistor conducting, is variable and is controlled by a fixed capacitor and a selected one of several timing resistors. The selected resistor is switched into the timing control circuit by an associated transistor, one being provided for each of the function selections. The conditioning of this associated transistor to connect the timing circuit resistor with the corresponding capacitor is controlled by the operator's selection of a particular operating mode for the motors and/or brakes of the train which he is controlling. This mode selection is here supplemental to the normal control stand with which the train is provided and which is incapable of actuating this particular communication system. The output signal of the multivibrator is supplied to the preselected train line wire upon which is superimposed this multichannel communication system of the invention. The resulting signals applied to the train line are a series of "on" pulses which are transmitted over the selected train line wire. Each "on" pulse, which corresponds to the first condition of the multivibrator, is of fixed duration. However, each corresponding or alternating "off" pulse is varied in duration in accordance with the operator's control function selection. This results in a function control signal characteristic represented by the variable duty cycle of the "on" pulses. Thus the actual signal characteristic by which the control function is transmitted, that is, the duty cycle characteristic, is a function of the operator's control lever selection.

At each function location, the receiver apparatus is connected so as to be interposed in the normal direct connection between the train line and the function controller at that location. Specifically, the function controller is shown as a propulsion-brake control unit for each car of the train. The transmitted function control signal is received by a single transistor registry stage of the receiver. This stage is so designed as to produce an average voltage signal which varies as the duty cycle characteristics of the incoming signal changes. A two-transistor comparator arrangement compares this average voltage level with a reference voltage level preset for the particular location. In this specific illustration, the reference voltage is preset in accordance with the desired operating mode for that particular car, in other words, how that car is to operate within the overall operation of the train during its movement along the track. The reference voltage setting thus establishes a control limit for the location receiver and more specifically, a control limit for operation of the comparator or level detector element. Depending in a predetermined manner upon the comparison between the average and the reference voltage levels, a transistorized amplifier element functions to actuate, "on" or "off," the function controller winding for that particular location, that is, as specifically shown, to control the propulsion and brake function for that car. Each car of the train thus functions similarly in receiving the control signals, although not simultaneously, in accordance with the various preset reference voltage levels on each car and the duty cycle characteristic of the signal transmitted from the control location.

I shall now describe in greater detail the arrangement embodying my invention, referring to the accompanying drawings in which.

Figure 1:
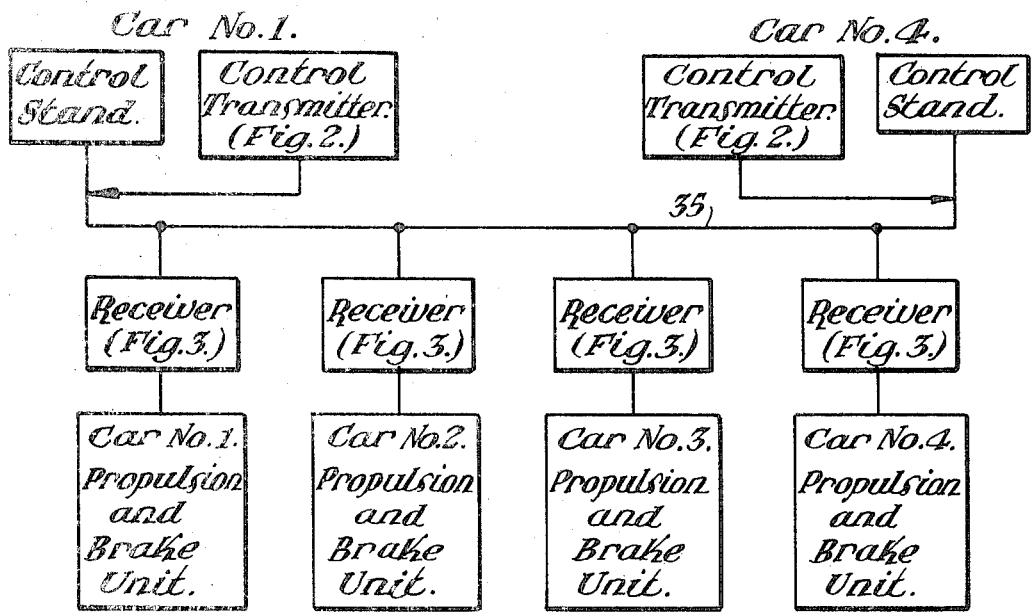
FIG. 1 is a schematic block diagram of an arrangement embodying the invention as applied to a typical four car train of a rapid transit system.

In each of the figures of the drawings, where applicable, similar reference characters refer to similar parts of the apparatus. Also in FIGS. 2 and 3, a direct current source of energy, suitable for the operation of the illustrated transistor circuits, is assumed. Preferably, this source of energy is the same as that applied for the operation of the other conventional car-carried apparatus. For convenience, this direct current supply is illustrated only by the symbol B+, designating a connection to the positive terminal, and a conventional ground symbol designating a connection to the opposite terminal of the source. As will be explained later, it is possible through the specific arrangement of the circuitry of my invention to use the regular car-carried direct current source of energy even though its actual voltage level may vary slightly from time to time.

Figure 2:
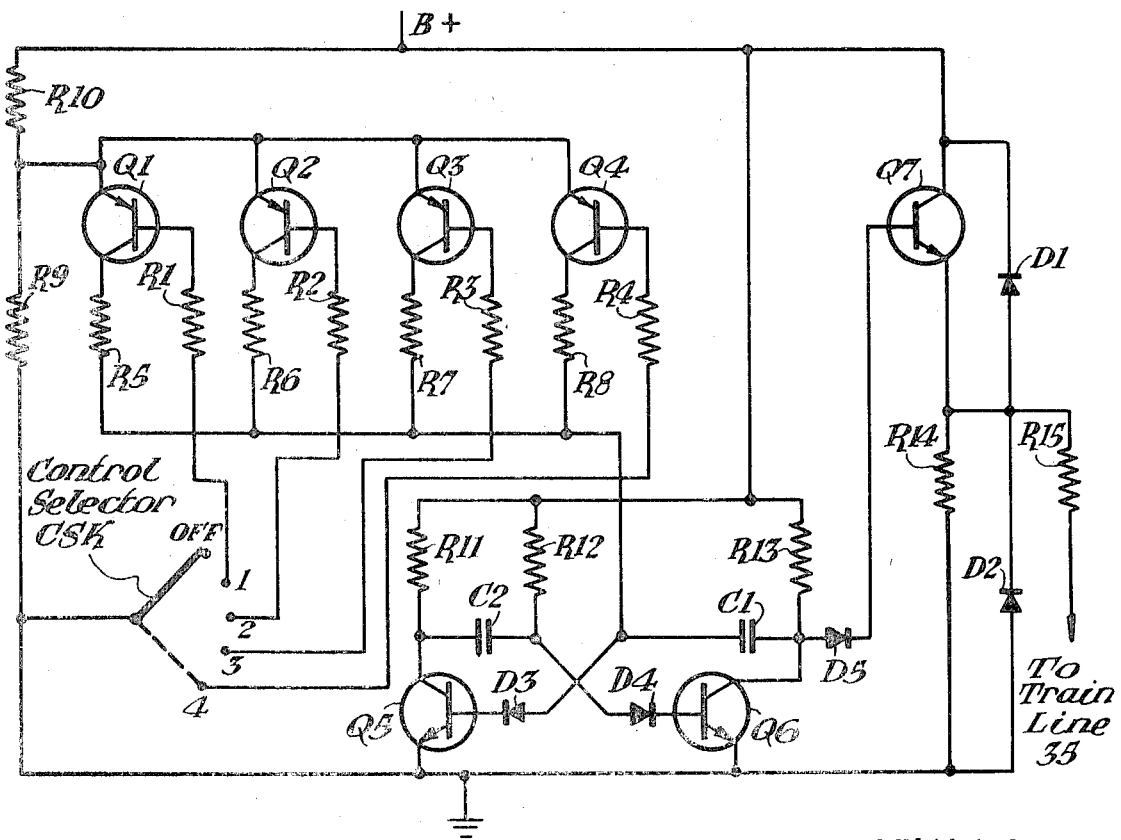
FIG. 2 illustrates control transmitter apparatus embodying features of the invention and usable in the arrangement shown in FIG. 1.

Referring now to FIG. 1, the schematic block diagram illustrates a train line communication and control arrangement embodying my invention as applied to control the propulsion-braking apparatus function on each car on a typical four car train unit which, for example, may be used in a rapid transit system. A control location for the train operator is shown on each end of the train which is a conventional arrangement to allow either direction operation of the train. Obviously, only one such control location is in use at any one time. As will also be understood by those familiar with such transit systems, each car of the train may have a control location so that it may be used as a lead car but, for simplicity, only two such locations are shown in the train unit illustrated. Each control location has a control stand illustrated by the conventional block which is typically a manually operated contactor controller. When such control is used, all of the brake and propulsion units on the train, that is, on all cars, operate in unison. Such controls are transmitted over train line wires as "on" and "off" signals to the various function controls on each car. My invention adds to this arrangement a control transmitter, also shown by a conventional block so designated, at each control location. This apparatus provides for a selective control operable by the train operator, the details of which are illustrated in FIG. 2 as referenced on the block diagram. The arrangement superimposes this selective control apparatus on a single train line channel designated in FIG. 1 by the reference 35. As will be understood, and become obvious later, this channel is actually a single wire of the train line cable and the usual ground return circuit path. As will also become apparent, only one of these control transmitters will be active at any one time, that is, the one at the location at which the train operator is at that time stationed.

Figure 3:
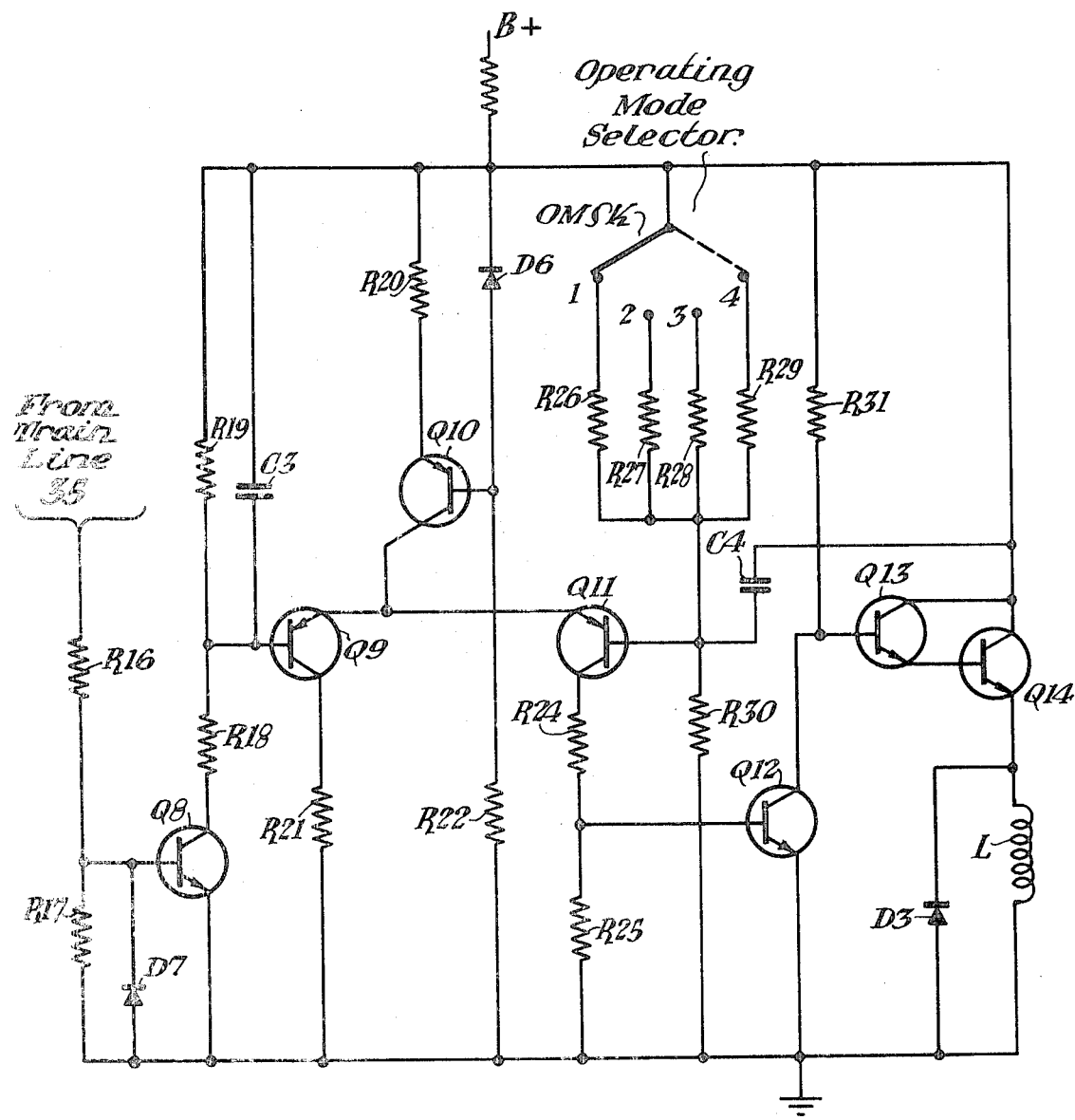
FIG. 3 illustrates receiver apparatus embodying features of my invention and also usable in the FIG. 1 arrangement as indicated therein.

At each controlled apparatus or function location, receiver apparatus is interposed between the function controller and the train line 35 carrying the selective signals. It is to be noted that, in the prior art arrangements, the function control apparatus is normally connected directly to the train line or lines so that no selective operation car by car is possible unless sufficient train line wires can be provided from the control stand locations. In this present arrangement, a receiver apparatus responds in a preset manner in accordance with operational limit characteristics preselected for each car location. In other words, the signal transmitted from the control location is received by each receiver unit in a selected characteristic signal form and is translated and compared with a preset operational limit for that location. If the received signal properly meets certain selected requirements, it is further translated into a function control signal and actuates the associated function in the desired manner. These control functions are progressively actuated from car to car as desired by system operation and in accordance with preset control limits established when the train is made up. The details of the receiver apparatus are shown in FIG. 3, as referenced in FIG. 1, and will be shortly discussed.

Referring now to FIG. 2, shown are the detailed circuits for the control transmitter unit illustrated by the conventional block in FIG. 1. The basic element of this transmitter is an asymmetrical, astable or free-running, multivibrator element comprising transistors Q5 and Q6 and the associated connections. The operation of multivibrator elements of this general type are sufficiently well known that a detailed description is unnecessary herein and a brief description is included only for an understanding of the specific operation provided in the present arrangement. The timing period for a first condition of the multivibrator, in which transistor Q5 is conducting, is fixed by the resistance-capacitor timing circuit including resistor R12 and capacitor C2. This specific circuit, of course, extends from the B+ terminal through the cited resistor and capacitor and the collector-emitter path of transistor Q5 to the ground terminal. Since this is a fixed timing circuit, it is obvious that the "off" or nonconducting time period for transistor Q6 is always of the same duration. The timing for the second condition of the multivibrator, in which transistor Q6 is conducting, is, however, variable. This timing is established by whichever one of the resistors R5 through R8 is connected in a series RC circuit with capacitor C1. The actual connection is controlled by the switching transistors Q1 through Q4, inclusive. For example, if transistor Q1 is biased to a conducting condition, resistor R5 is connected in series circuit with capacitor C1, the circuit extending from terminal B+ through resistor R10, the emitter-collector path of transistor Q1, resistor R5, capacitor C1, and the collector-emitter path of transistor Q6 to ground terminal.

The switching transistors Q1, Q2, Q3, and Q4 are controlled by a control selector switch CSK. This switch, or operating lever, is located adjacent to the control stand at a control location for the train and is operable by the operator to exercise a more selective control of the specific apparatus with which it is related. As shown in FIG. 1, this apparatus, for example, may be the propulsion and brake controller units on each car. Switch CSK is positioned in its OFF position when that particular control location is not in use, that is, is not in the lead car of the train. The four numbered positions designate the type or mode of train operation which results when the switch is so positioned. These numbered positions may also be considered as designating more simply the number of cars in a four car train on which the corresponding controlled apparatus is selectively turned "on" or "off." The operation of the switch CSK to each numbered position specifically connects the base of the correspondingly numbered transistor Q1 to Q4 to the ground terminal so that that transistor and, of the four, that transistor only becomes conducting. When any one of these transistors is in its conducting condition, the resistor connected to the collector terminal is connected in series circuit with capacitor C1, as previously described, to provide a particular selected timing period for the second condition of the multivibrator element. By a proper selection of the values of resistors R5 to R8 in designing the system, a progressive sequence of operating times for transistor Q5 may be obtained as switch CSK is moved to select the various operating modes 1 to 4, respectively.

The output of the multivibrator element, from the collector terminal of transistor Q6, is applied to the base of transistor Q7 which is connected in an emitter follower arrangment. The output of this latter arrangement, at the emitter terminal of transistor Q7, is supplied as the transmitted signal to the train line 35, which is a single communication circuit path as illustrated in FIG. 1. Transistor Q7 is obviously conducting when transistor Q6 is in its nonconducting condition and the output supplied to channel 35 is thus a B+ potential pulse when transistor Q6 is turned "off." Therefore the positive pulses in the signal on train line 35 are of equal duration. Conversely, the "OFF" or ground potential pulses vary in time duration in accordance with the operating time of transistor Q5. Thus the positive code pulses on channel 35 have a duty cycle characteristic, that is, a percent ON time in accordance with the position of selector switch CSK. It is to be noted that the frequency of the ON pulses is not the important characteristic of the transmitted signal, but only the total time the positive or ON pulse is present within a preset time period, e.g., a complete cycle of operation comprising an ON time and the following OFF time.

I shall refer now to FIG. 3 for the circuits for the receiver unit supplied on each car of the train. Signals supplied by the transmitter of FIG. 2 are received over train line 35 at resistor R16 at the left of the circuits shown. These signals are applied to the base terminal of transistor Q8. This transistor registers and converts the incoming signal pulses into a steady state direct current signal which is proportional to the voltage on terminal B+ and the percent duty cycle characteristic of the received signal. This steady state direct current is also defined as an average value signal which varies in level in accordance with variations in the duty cycle characteristic. This average voltage signal appears at the common junction of resistors R18, R19, and capacitor C3. Obviously this average value voltage signal, as determined by the duty cycle characteristic, is applied to the base of transistor Q9.

Transistors Q9, Q10, and Q11 form a level detector or comparator element, with transistor Q10 connected only to provide a constant current source for transistors Q9 and Q11. The signal applied to the base of transistor Q11 is a reference voltage obtained from terminal B+ selectively through resistors R26, R27, R28, or R29 with the voltage divider arrangement completed through resistor R30. Capacitor C4 is connected as a bypass to drain any ripple voltage appearing at the B+ terminal. The operating mode selector switch OMSK is preset, when the train is originally assembled, to provide the desired individual operation of that car in the overall train operation. For example, switch OMSK may be set at the numbered position corresponding to the position of that car in the train. In other words, on the first car of the train, switch OMSK would be set at position 1 and correspondingly, for the second, third, and fourth cars in the four car train shown in FIG. 1, at positions 2, 3, and 4, respectively. Other methods of selection of the car operating modes are possible as different operating conditions for the train are desired. It is assumed for the remaining description that a sequential selection is used in the train in FIG. 1, that is, the switch position number corresponds to the car number within the train.

It is to be noted that the average voltage signal applied to the base of transistor Q9 and the reference voltage signal at the base of transistor Q11 are both derived from the B+ terminal of the corresponding car since the complete receiver unit is provided on each car of the train. Any change in the level of B+ will affect each applied signal by the same ratio of change. Therefore, voltage variations in the direct current source on a particular car, that is, changes in the voltage level at B+ terminal, will not affect the comparison of the signals applied to the opposite sides of the comparator unit. This ratio elimination of the effects of voltage changes also eliminates the need for a separate, constant voltage power source on each car, that is, separate from the usual power supply provided for other car apparatus. Provision of such a separate source is inconvenient and inefficient since it requires additional and redundant equipment.

The comparator element is preferably so designed that, when the average voltage signal level is less than that of the reference voltage, transistor Q9 becomes conducting and transistor Q11 is turned "off." Conversely, when the average voltage signal is greater than the level of the reference voltage preset for that car, transistor Q11 only conducts. In the FIG. 3 receiver circuits, the remaining transistors Q12, Q13, and Q14 form an amplifier elements to control or drive the function controller apparatus represented by the winding L. This amplifier element is conventional circuitry in the art and its operation is understandable without specific description herein. The winding L, of course, represents the control function being controlled by the communication system, specifically shown in FIG. 1 as being the propulsion and brake unit apparatus. It is to be understood that supplemental controls may be applied to select between various subelements of this overall function control unit in a conventional manner over other wires of the train line. Such arrangements are not involved in the invention described herein and thus are not shown.

Briefly considering the amplifier element, it is obvious that when transistor Q11 is nonconducting, transistor Q12 is also in its nonconducting condition. In this situation transistor Q13 is triggered, so that both it and transistor Q14 are in their conducting condition. Winding L is then energized to actuate the control function to a desired condition or position. If transistor Q11 is conducting, that is, the reference voltage is less than the average voltage signal in the comparator element, transistor Q12 is also biased to its on condition. With this latter condition conducting, transistors Q13 and Q14 are biased to their off or nonconducting condition. Winding L is then deenergized and the control function is conversely actuated or released according to its characteristics.

Considering now a specific operational situation, it is assumed that it is desired to provide the train operator with the facility to have the cars of the four car train, FIG. 1, respond in a sequential manner to transmitted control functions regarding the propulsion and brake unit apparatus on each car. This operational selectively is provided in lieu of the more conventional all on or all off type of operation. A typical selection of the resistors R5 through R8 will then provide, as a specific example, a duty cycle characteristic for the transmitted signal ranging between an 80 percent duty cycle when resistor R5 is connected and reducing to a 50 percent duty cycle characteristic when resistor R8 is in service. Each intervening resistor provides a corresponding intermediate characteristic signal level. Said in another manner, when lever CSK occupies its position 1, transistor Q1 conducts. The RC timing characteristic for the circuit through resistor R5 and capacitor C1 is relatively short so that the off-time or nonconducting period for transistor Q5 is also short. Conversely, transistor Q6 on-time is relatively short so that the off time of transistor Q7 is also short. A signal having a potential of B+ is then transmitted 80 percent of the time over train line 35, the remaining 20 percent of each cycle being a ground or OFF potential pulse. At the other extreme position of switch CSK, that is, position 4, transistor Q4 is conducting. Resistor R8 is so selected that the timing characteristic of the circuit including resistor R8 and capacitor C1 is equal to the timing characteristic of the circuit including resistor R12 and capacitor C2. It will be obvious that under these conditions the B+ signal pulse on line 35, through the operation of transistor Q7 under these conditions, is equal to the OFF or ground potential pulse so that the duty cycle is 50 percent. Obviously, the circuit parameters can be so designed that the lowest duty cycle is less than 50 percent if desirable in system operation, or required to obtain specific operating situations. Specifically, when switch CSK is positioned at points 2 or 3, the duty cycle will be at a selected characteristic between the assumed 80 percent and 50 percent characteristics of the extreme positions, such as, by way of specific examples, 70 percent and 60 percent, respectively.

The same characteristic signal is, of course, applied over train line 35 to the base of transistor Q8 in the receiver on each car of the train. This actuates conduction of transistor Q8 during the positive pulse portion of each cycle so that the operating condition of transistor Q8 has the same duty cycle characteristic. If it is further assumed that resistor R18 is equal in value to resistor R19 in the circuit through and including the collector-emitter path of transistor Q8, then the average voltage signal level, at the junction of these two resistors and capacitor C3, will be one-half of the B+ terminal voltage level times the duty cycle percentage. Specifically, for example, if resistor R5 controls the transmitter multivibrator element, the average voltage signal at the base of transistor Q9 is then 40 percent of the B+ voltage level. This result is obtained by taking 80 percent of one-half of the B+ level in the voltage divider circuit. Also specifically, when resistor R8 controls the multivibrator characteristic output, the average voltage signal at transistor Q9 is at a level of 25 percent of the B+ terminal voltage level.

With the specific assumptions used above to describe examples of transmitted characteristic signals, the reference voltage level at the base of transistor Q11, with switch OMSK in position 1, must be greater than 40 percent of B+ voltage. In other words, R26 on each car must be so selected as to divide the voltage potential between B+ and ground terminals, when the divider includes resistors R26 and R30, that the voltage potential at the common junction of these two resistors is slightly more than 40 percent of the total available from the B+ terminal. Under the same assumptions, resistor R29 on each receiver must be so selected that, when this resistor is selected by positioning switch OSMK to its number 4 position, the reference voltage is greater than 25 percent of the B+ terminal voltage potential but less than this B+ terminal voltage multiplied by one-half the duty cycle characteristic established by resistor R7 at the transmitter location. For example, if a 60 percent duty cycle results from the selection of R7, then the reference voltage established by the selection of resistor R29 must be less than 30 percent but more than 25 percent of B+. The values of the other resistors R27 and R28 must be selected in a similar manner so that when either of these resistors is used in the voltage divider circuit to establish the operating characteristic, the reference voltage will be properly established between upper and lower limits set by the associated duty cycle characteristics of the transmitted control signals. Such values may be calculated, if desired, by reference to the above description but are not specifically defined herein.

It is now further assumed that, for the cars of the train of FIG. 1, the switches OSMK are set in sequence from the leading end at positions 1, 2, 3, and 4, respectively, on the correspondingly numbered cars. Then the train operator, by positioning switch CSK at its number 1 position, will actuate only the control function winding L on the first car. In other words, with the average voltage at the base of transistor Q9 on each car being at 40 percent of B+ voltage, the average voltage will be greater than the reference voltage or operating control limit on all but the first car of the train. On this first car, the average voltage level is less than the reference voltage level since switch OMSK is positioned to include resistor R26 in the voltage divider network. As previously explained, this results in a reference voltage signal greater than 40 percent of B+ terminal voltage. Under these conditions, the amplifier element including transistors Q12, Q13, and Q14 operates to energize winding L. Only when control selector switch CSK is in its position 4, so that the duty cycle characteristic is established at 50 percent, is the average voltage less than the reference voltage on each car. Under these conditions, the average voltage is at 25 percent of the B+ terminal level. In this condition, the controller winding L on each car is energized. Obviously, the circuit parameters may be selected to give other values of the transmitted characteristic signals and the reference voltage levels so that additional cars may be included in the train or other operating conditions may be provided for the operator's selection.

The system of my invention thus provides an unique and effective communication arrangement which adds capacity to a train line communication arrangement. The system provides for a transmission of additional control functions which allow smoother and more efficient train operation. The arrangement is also so designed that a special power supply on each car is avoided and the normal car power supply may be used since the effect of variations in the B+ terminal voltage level are, by the ratio arrangement, cancelled out in comparing the average and the reference voltage signals on each car. An effective, efficient, and practical arrangement thus results and provides additional communication and/or control channels over a fixed number of train line wires.

Although I have herein shown and described but a single form of the system embodying my invention, it is understood that changes and modifications within the scope of the appended claims may be made in the illustrated arrangement without departing from the spirit and scope of the present invention.

Having thus described my invention, what I claim is:

1. A train line control system for transmitting control functions over a single communication channel between two locations on a multi-car train, comprising in combination,
  a. a multivibrator means for producing periodic pulses having a preset form and connected for transmitting said pulses through said train line channel,
  b. a selector means operable to select a desired one of a plurality of control functions,
  c. said selector means controlling said multivibrator means for establishing a different duty cycle characteristic for said periodic pulses for each possible control function selection,
  d. averaging means connected for receiving said periodic pulses and responsive thereto for registering an average signal in accordance with the characteristic duty cycle of the received pulses,
  e. a level detector having a preset operating characteristic and controlled by said averaging means for determining the relationship between said averaged signal and the preset operating characteristic, and
  f. function control means controlled by said level detector for actuating an associated control function when said averaged signal has a predetermined relationship to said operating characteristic.

2. A train line control system as defined in claim 1, further comprising,
  a. an averaging means for each car of said train connected for receiving said periodic pulses and responsive thereto for registering the same averaged signal on each car for each different duty cycle characteristic,
  b. a level detector associated with each averaging means, each level detector having a different preset operating characteristic and controlled by the associated averaging means for determining the relationship between the averaged signal and the corresponding operating characteristic, and
  c. a function control means controlled by each level detector for actuating the associated control function only when said predetermined relationship exists between the averaged signal supplied to, and the operating characteristic of, the controlling level detector.

3. A train line control system as defined in claim 2 in which,
  a. said multivibrator means and said selector means are located at the control station of said train,
  b. each set of averaging means, level detector, and function control means is located on a different car of said train,
  c. the preset operating characteristics of the plurality of level detectors are of successively different levels, and
  d. the duty cycle characteristic associated with each of said plurality of control functions has a successively different value for successively actuating the control function on an additional car of said train as successive control functions are selected by said selector means.

4. A train line control system as defined in claim 3 in which,
  a. said multivibrator means is an asymmetrical astable transistorized multivibrator element having a fixed timing circuit for one transistor,
  b. said selector means includes a transistor switching bank which varies the timing circuit for the other transistor of said multivibrator element to change the duty cycle characteristic of the pulsed output as different control functions are selected,
  c. each level detector is a two transistor comparator circuit with said averaged signal applied as an average voltage to the control terminal of one transistor and said operating characteristic applied as a preset reference voltage to the control terminal of the other transistor,
  d. each level detector being adjusted for actuating the corresponding function control means only when the averaged signal voltage is less than the reference voltage.

* * * * *